United States Patent [19]

Proulx

[11] Patent Number: 4,476,632

[45] Date of Patent: Oct. 16, 1984

[54] MULTIPLE FLAIL HEAD FOR A ROTARY MOWER

[76] Inventor: Raymond E. Proulx, 5837 Cameo St., Alta Loma, Calif. 91701

[21] Appl. No.: 402,944

[22] Filed: Jul. 29, 1982

[51] Int. Cl.³ .............................................. A01D 35/26
[52] U.S. Cl. ....................................... 30/276; 56/12.7
[58] Field of Search .................. 30/276, 347; 138/155; 285/33 D; 56/12.7, 17.5, 295

[56] References Cited

U.S. PATENT DOCUMENTS

| 171,245 | 12/1875 | Sage | 285/330 |
| 4,209,902 | 7/1980 | Moor et al. | 56/12.7 |
| 4,242,797 | 1/1981 | Palmieri et al. | 30/276 |

Primary Examiner—E. R. Kazenske
Assistant Examiner—Douglas D. Watts
Attorney, Agent, or Firm—Boniard I. Brown

[57] ABSTRACT

An improved cutting head for rotary mowers and trimmers for vegetation, having major components that are interchangeable and reversible, comprises a pair of housing members having cylindrical side portions and radially extending portions. The housing members are coaxial and enclose a pair of coaxial flail spools, each spool having at least one flail and preferably a pair of flails, wound thereon. Flail may be extended from both spools to provide four cutting flails or from only one spool to provide two cutting flails. The spools are stressed apart axially toward confronting inner surfaces of the housing members by a compressed spring therebetween, thus to cause ribs on the spools and stop lugs on the inner surfaces of the housing members to cooperate in providing ratchet arrangements to allow portions of flails to be fed through the housing member cylindrical side portion upon release of a manual knob. With the knob tightened, the housing members are secured against the spools so that the ratchet arrangements secure the spools against turning, while the housing members are seated together to define an enclosure for the spools.

18 Claims, 8 Drawing Figures

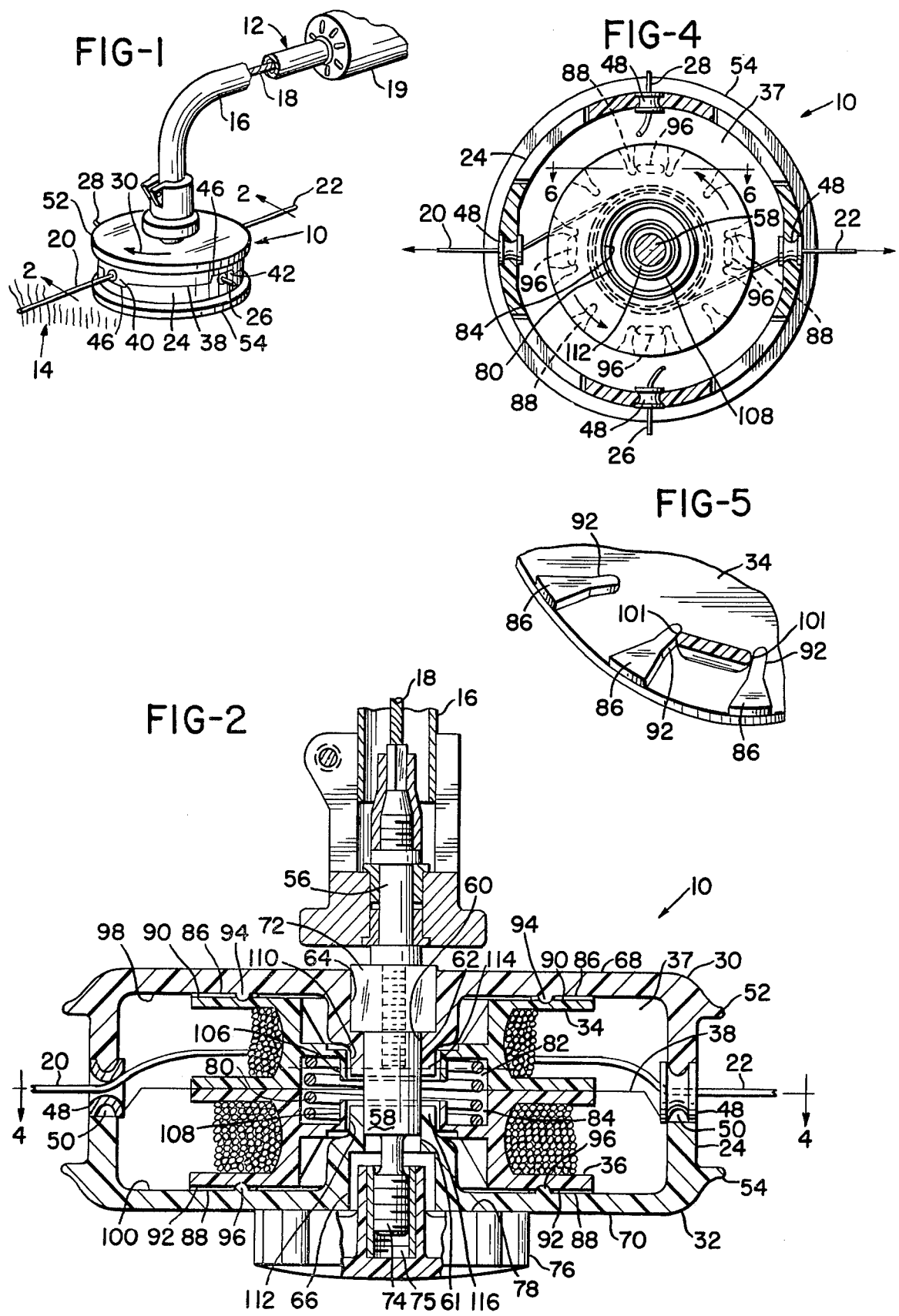

MULTIPLE FLAIL HEAD FOR A ROTARY MOWER

BACKGROUND OF THE INVENTION

This invention relates to improved multiple flail heads for mowing and trimming devices used to trim grass, weeds and other vegetation of the rotary type equipped with flexible cord-like flails formed of generally cylindrical fibers. Grass and weed cutters of this general type are now widely used. Examples are described in REBER, U.S. Pat. No. 3,664,102; BALLAS, et al, U.S. Pat. No. 3,826,068; MIZUNO, U.S. Pat. No. 4,020,552; BALLAS, et al, U.S. Pat. No. 4,035,912; PROULX, U.S. Pat. No. 4,097,991; BALLAS, U.S. Pat. No. 4,104,797 and PROULX, U.S. Pat. No. 4,203,212. Such devices are available on the market having both manual and semi-automatic flail feedout mechanisms. The semi-automatic flail feedout mechanisms usually respond to a bump on the ground intentionally applied by the operator. Others, such as shown in BALLAS, U.S. Pat. No. 4,104,797 include manual buttons which when depressed, allow flail to be fed out from multiple spools spaced in quadrants, circumferentially about a generally cylindrical cutting head. It is unfortunate that such geometry results in a minimal diameter on which the spool can retain flail and the possibility that uneven use may unbalance the spinning head. Therefore, means have been needed which allow multiple flails to be used with a simply constructed, single cutting head, which head can retain a large quantity of flail, remain balanced, and yet not have the complexity and operational difficulties encountered in the prior bump-type semi-automatic feed mechanisms.

SUMMARY OF THE INVENTION

The present invention includes a substantially cylindrical rotating body driven from a power source directly or through a flexible driveshaft. The flails forming the cutting means of the device are stored within the cylindrical body on a pair of spools. The ends of the flails are fed through orifices in grommets distributed uniformly about the peripheral side of the body along a circumferential line coincident with the cutting plane, orthogonal to the rotational axis of the body.

The flails are made of a filamentary material with a high tensile strength and a relatively low modulus, so that the flails are highly flexible and are not self-supporting in the quiescent state. Upon rotation of the body at high speed, the flails are extended into a radial orientation by the centrifugal force acting on them, and thereby become semi-rigid. This rigidity imparts sufficient strength to the flails to permit the severance of the stalks, leaves and other components of vegetation intersecting the cutting plane. The strength and kinetic energies of the low-mass flails are insufficient, however, to cut more rigid objects, or to impart sufficient energy to impel them out of their rest positions. The preferred material of the flails is nylon monofilament, and experience indicates that a length to diameter ratio of from 20:1 to 30:1 provides the best cutting action with the least danger of damage to the flails.

In the present invention, the cylindrical rotating body is constructed of a pair of housing members which are essentially identical and interlock to form the hollow body. The power source is connected to a central axle member employed to retain the housing members together for rotation. Each of the spools, which also are essentially identical, preferably has a pair of flails wound thereabout so that relative rotation of a spool with respect to the body allows a pair of flails to be symmetrically fed out of the peripheral side of the body through oppositely positioned feed grommets. It is preferable that four grommets be positioned in the body, two opposite each other in each housing member so that the second reel can be used either as a reserve reel with its flails not extending far enough through grommets to be a source of effective cutting action or as a second pair of flails extended out the grommets at approximately 90° from the first pair of flails to provide a four flail cutting head. The spools are mounted about the axis of rotation and are stressed apart by a compression spring trapped therebetween. The spring urges ribs on the spools to engage stop lugs positioned on the inner surfaces of each housing member, thus to retain the spools in stable positions relative to the grommets. When it is desired to release more flail, a manual knob, threadably connected on the opposite end of the axle member from the drive source, is loosened, allowing the housing members to separate slightly. This provides space so that the force of the spring applied at the ribs and stops of the spools and housing members can be overcome, enabling flail to be pulled out manually through the grommets in manually sensed increments. Upon retightening of the knob, the spools are again restrained against relative rotation with respect to the grommets to prevent undesired flail feed. The upper and lower housings, and the spools which are the major components subject to wear, can be constructed identically with the attendant savings in manufacturing, repair, and supply of spare parts.

Therefore it is an object of the present invention to provide an improved multiple flail cutting head which has an easily and positively operating flail feed-out mechanism.

Another object is to provide a multiple flail cutting head for a rotary mower which can selectively provide two or four flails for cutting.

Another object is to provide a multiple flail cutting head wherein two spools of flail material are provided mounted concentrically with the axis of rotation so that one can be used as a reserve without unbalancing the head.

Another object is to provide a multiple flail cutting head for rotary mowers whose major components are constructed in interchangeable pairs.

These and other objects and advantages of the present invention will become apparent to those skilled in the art after considering the following detailed specification in conjunction with the accompanying drawings wherein:

BRIEF DESCRIPTION OF THE DRAWINGS

FIG. 1 is a perspective view of the present invention shown arranged for cutting with two of the available four flails;

FIG. 2 is an enlarged cross-sectional view taken on line 2—2 in FIG. 1, showing the interior details of the present invention;

FIG. 4 is a cross-sectional view taken at line 4—4 of FIG. 2;

FIG. 5 is an enlarged fragmentary perspective view of the details of the spool indexing means for the cutting head.

DETAILED DESCRIPTION OF THE PREFERRED EMBODIMENT

Figure 3:
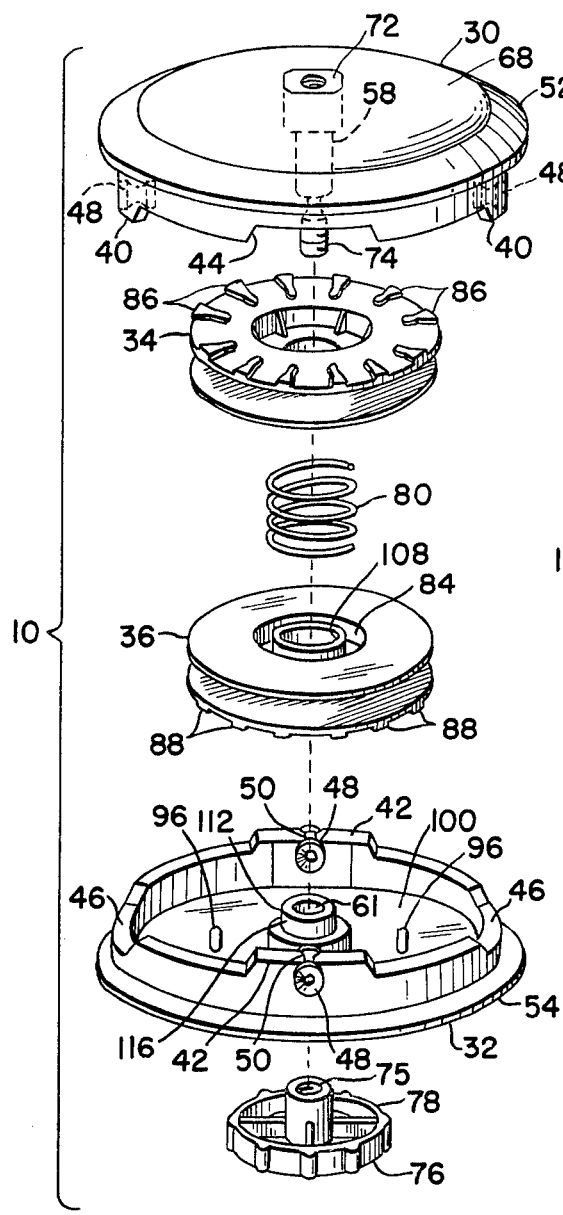
FIG. 3 is an exploded view of the cutting head of FIGS. 1 and 2.

Referring to the drawings more particularly by reference numbers, number 10 in FIG. 1 refers to a rotary cutting head constructed according to the present invention. The head 10 is a portion of a trimming device 12 for trimming vegetation 14. The cutting head 10 is supported from a hollow stalk 16 which serves both as a guide tube for a flexible driveshaft 18 connected to a motor 19, and as a handle by which the user operates the cutting device 12. The operator uses the stalk 16 to move the cutting head 10 so that flails 20 and 22, extending oppositely from the generally cylindrical side surface 24 and if desired additional flails 26 and 28 extending oppositedly from the side surface 24 at 90° to the flails 20 and 22, are impelled into a radial attitude by rapid rotation of the cutting head 10 in the sense of the arrow 30 into the grass or other vegetation 14 to be trimmed. The plane defined by the rotating flails 20, 22, 26 and 28 corresponds to the desired trimming or cutting plane.

As shown in FIGS. 2 and 3, the head 10 includes two main pairs of components, upper and lower housing members 30 and 32, and upper and lower spools 34 and 36 positioned in a chamber 37 within the head 10 formed by the members 30 and 32. As can be seen, flails 20 and 22 extend from the upper spool 34. However, it is not important which flails 20 and 22, or 26 and 28, extend from a particular spool 34 or 36 so long as each flail of a pair of flails extends 180° from the other out through the side surface 24. As also can be seen, each pair of flails 20 and 22 or 26 and 28 is wound together on a different spool 34 or 36.

As shown in FIG. 1, the interface 38 between the housing members 30 and 32 at the surface 24 includes a pair of matching teeth 40 and 42 and grooves 44 and 46 which serve to lock the housing members 30 and 32 from relative rotation and to transfer torque therebetween. Grommets 48 are provided in suitable grooves 50 in the teeth 40 and 42 through which the flail 20, 22, 26 and 28 can be fed out of the head 10 into a cutting position. The grommets 48 reduce the bending stress in the flail so that it does not tend to shear off adjacent the surface 24. Upper and lower circumferential ribs 52 and 54 bound the cylindrical surface 24 extending radially outwardly from the members 30 and 32 respectively to further reduce the chances of flail shearing.

Rotational energy is imparted to the cutting head 10 from the flexible drive shaft 18 by means of an axle 56 which threadably connects with an axis member 58. The axis member 58 is positioned within cylindrical inner surfaces 60 and 61 in the housing members 30 and 32. The axis member 58 includes a cylindrical outer surface 62 mated to the surfaces 60 and 61. Each housing member 30 and 32 has a non-circular cavity 64 and 66 adjacent its outer radial surface 68 and 70. A spacer portion 72 of the axis member 58, shaped to mate with the cavity 64, is positioned in the cavity 64 of the upper housing member to apply torque to the head 10 from the axle 56. A threaded portion 74 of the axis member 58 extends into the cavity 66 of the lower housing member 32 where it is engaged by a threaded insert 75 of a manually operable knob 76. When tightened down on the threaded portion 74, the knob 76 bears with its under surface 78 against the surface 70 of the lower housing, holding the two housing members 30 and 32 together.

When the knob 76 is rotated with respect to the axis member 58 to release the force otherwise established between the spacer 72 and the knob 76 across the head 10, a compression spring 80 mounted in facing grooves 82 and 84 concentric about the axis member 58 of the upper and lower spools 34 and 36, forces the spools 34 and 36 and the housing members 30 and 32 apart.

Figure 6:
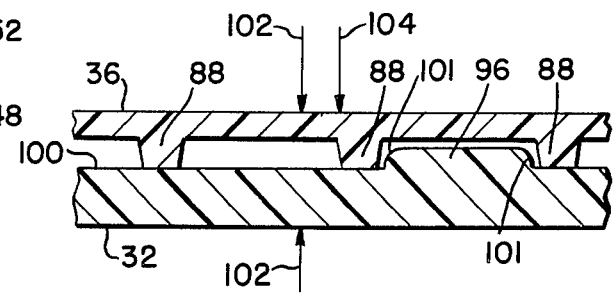
FIGS. 6, 6A and 6B are enlarged detail cross-sections taken generally on line 6—6 in FIG. 4 showing the functional details of the spool indexing means.
Figure 6A:
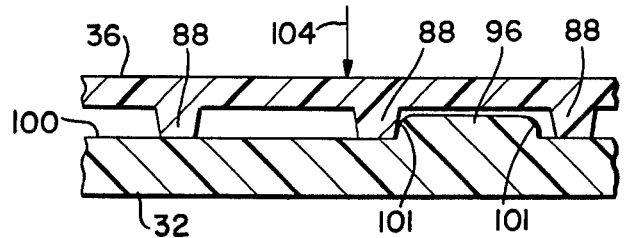
Figure 6B:
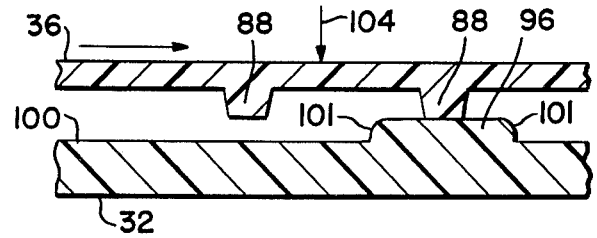

As shown in FIGS. 4, 5, 6, 6A and 6B, the spools 34 and 36 include ribs 86 and 88 of generally trapezoidal cross-section positioned as a relief on their outer radial surfaces 90 and 92 which engage stop lugs 94 and 96 molded on the inner radial surfaces 98 and 100 of the housing members 30 and 32. The lugs 94 and 96 have semi-spherical relieved ends 101 for engagement with the ribs 86 and 88. When the knob 76 is in its tightened condition, the interlocking ribs 86 and 88 and stop lugs 94 and 96 assure no relative rotational movement between the spools 34 and 36 and the housing members 30 and 32, so that the length of flail extending out of the head 10 remains relatively constant. This is the condition shown in FIG. 6. When the knob 76 is loosened, the mechanical force shown by arrows 102 is eliminated, as shown in FIG. 6A, so that only the force provided by the spring 80, shown by arrow 104, may be overcome, for the spool 36, in the example of FIG. 7, to be moved with respect to the housing member 32. The spring force 104 is chosen so that manual pulling of opposite flails 20 and 22 or 26 and 28 causes the trapezoidal ribs 86 or 88 to ride up over the relieved ends 101 of the stop lugs 94 and 96 so that an indexed amount of flail, manually discernable by a change in force required to pull flail, can be fed out through the grommets 48. The spools 32 or 34 each include an inner cylindrical flange 106 or 108, respectively, which acts as a bearing against a radially outwardly facing cylindrical surface 110 or 112 on the housing members 30 or 32 to allow relative rotation between the spools and their adjacent housing members 30 or 32. The surfaces 110 and 112 are the outer surfaces of cylindrical flanges 114 and 116 whose inner surfaces are cylindrical surfaces 60 and 61. When the desired amount of flail has been fed out, the knob 76 is retightened, locking the ribs 86 and 88 and stop lugs 94 and 96 together, so that the centrifugal force of operation can be endured without additional flail self-feeding out of the head 10.

Therefore there has been shown and described a novel rotary cutting head which fulfills all of the objects and advantages sought therefor. Many changes, modifications, variations, alterations and other uses and applications of the subject cutting head will become apparent to those skilled in the art after considering the specification and drawings. All such changes, modifications, variations and other uses and applications which do not depart from the spirit and scope of the invention are deemed to be covered by the invention which is limited only by the claims which follow.

The inventor claims:

1. A mower for cutting vegetation having at least one cutting flail extending outwardly from a spinning assembly, and comprising:
   means for generating rotary motion,
   means for transmitting rotary motion connected with the means for generating rotary motion, and a rotatable cutting head connected with the means for generating rotary motion by the means for transmitting rotary motion, said cutting head including:

first and second housing members, each having a cylindrical side portion defining at least one orifice, a central cylindrical portion, a radially extending portion interconnecting the side portion to the central portion, and a radial abutment surface on the cylindrical side portion opposite from the radially extending portion, said first and second housing members being so positioned that their radial abutment surfaces are in confronting relation to define a chamber between the first and second housing members, first and second spools mounted on said central cylindrical portions in said chamber, each spool having wound thereon at least one flail for extension through one of said orifices, and means to selectively limit relative rotation between the first spool and the first housing member and between the second spool and the second housing member, including means to selectively hold said first and second housing members together, first releasable abutment means on the first spool and second releasable abutment means on the first housing member, said first and second releasable abutment means being configurated and arranged to lock the first spool and first housing member together when said means for selectively holding are holding the first and second housing members together, and to allow restrained relative rotation of the first spool and first housing member when the means for selectively holding are not holding the first and second housing members together, and third releasable abutment means on the second spool and fourth releasable abutment means on the second housing member, said third and fourth releasable abutment means being configurated and positioned to lock together the second spool and second housing member when the means for selectively holding are holding the first and second housing members together, and to allow restrained relative rotation of the second spool and second housing member when said means for selectively holding are not holding the first and second housing members together.

2. The mower defined in claim 1, wherein:
said first and second spools are of identical construction, and said first and second housing members are of identical construction.

3. The mower defined in claim 2, wherein:
said first spool has two flails wound therearound in the same direction and said second spool has two flails wound therearound in the same direction, and said first and second housing members each define two orifices through which flail can be extended.

4. The mower defined in claim 1, wherein:
said first and third releasable abutment means are a plurality of radially extending spaced ribs, and said second and fourth releasable abutment means are a plurality of circumferential lugs positioned for engagement with said plurality of ribs.

5. The mower defined in claim 4, wherein:
said plurality of circumferential lugs have relieved end portions for engagement with said ribs, and said plurality of radially extending spaced ribs have trapezoidal cross-sections to provide relief so that said ribs and said lugs can slide up and over each other when said means to selectively hold said first and second housing members together are released.

6. The mower defined in claim 5, and further including:
a compressed spring positioned between said first and second spools to urge said ribs and lugs together.

7. The mower defined in claim 6, wherein said means to selectively hold said first and second housing members together include:
an axis member extending through said first and second housing members and said first and second spools, and connected to said means for transmitting rotary motion, said axis member having:
a torque transmitting portion connected to said first housing, and
a threaded portion adjacent said second housing member, and
a manual knob having:
a threaded portion engaged with said threaded portion of said axis member, and
a knob abutment surface in engagement with said second housing member to urge said second housing member toward said first housing member.

8. The mower defined in claim 7, wherein:
said first and second spools include facing radial grooves concentric to said axis member in which said spring is positioned.

9. The mower defined in claim 7 wherein:
said first and second housings include a non-circular inner surface, said torque transmitting portion being shaped to mate with said non-circular inner surface to apply torque therebetween.

10. A rotary mower head for mowing and trimming vegetation by means of cutting flails, comprising:

first and second essentially identical housing members each having a cylindrical side portion defining at least one orifice, a central cylindrical portion, a radially extending portion connecting said cylindrical side portion to said central cylindrical portion, and a radial abutment surface on said cylindrical side portion opposite from said radially extending portion, said first and second housing members being so positioned that said radial abutment surfaces thereof are in confronting relation to define a chamber between said first and second housing members, first and second essentially identical spools mounted on said central cylindrical portions in said chamber, each spool having at least one flail wound thereon for extension through one of said orifices, and means to selectively limit relative rotation between said first spool and said first housing member and between said second spool and said second housing member, including:

means to selectively hold the first and second housing members together, first releasable abutment means on the first spool and second releasable means on the first housing member, said first and second releasable abutment means being configurated and arranged to lock the first spool and first housing member together when the means for selectively holding are holding the first and second housing members together and to allow restrained relative rotation of the first spool and the first housing member when the means for selectively holding are not holding the first and second housing members together, and third releasable abutment means on the second spool and fourth releasable abutments means on the second housing member, said third and fourth releasable abutment means being configured and arranged to lock the second spool and second housing member together when said means to selectively hold are holding the first and second housing members together, and to allow restrained relative rotation of the second spool and second housing member when said means to selectively hold are not holding the first and second housing members together.

11. The rotary mower head defined in claim 10, wherein:

said first spool has two flails wound therearound in the same direction and said second spool has two flails wound therearound in the same direction, and said first and second housing members each have two defined orifices through which flail can be extended.

12. The rotary mower head defined in claim 1, wherein:

said first and third releasable abutment means are a plurality of radially extending spaced ribs and said second and fourth releasable abutment means are a plurality of circumferential lugs positioned for engagement with said plurality of spaced ribs.

13. The rotary mower head defined in claim 12, wherein:

said plurality of circumferential lugs have relieved end portions for engagement with said ribs and said plurality of radially spaced ribs have trapezoidal cross-sections to provide relief so that said ribs and said lugs can slide up and over each other when said means to selectively hold said first and second housing members together are released.

14. The rotary mower head defined in claim 13, and further including:

a compressed spring positioned between said first and second spools to urge said ribs and lugs together.

15. The mower head defined in claim 13, wherein said means to selectively hold said first and second housing members together include:

an axis member extending through said first and second housing members and said first and second spools, said axis member having:
  a torque transmitting portion connected to said first housing, and
  a threaded portion adjacent said second housing member, and a manual knob having:
  a threaded portion engaged with said threaded portion of said axis member, and
  a knob abutment surface in engagement with said second housing member to urge said second housing member toward said first housing member.

16. The mower head defined in claim 15, wherein:

said first and second housings include a non-circular inner annular surface, said torque transmitting portion being shaped to mate with said non-circular inner surface to apply torque therebetween.

17. A mower for cutting vegetation having at least one cutting flail extending outwardly from a spinning assembly, and comprising:

means for generating rotary motion, means for transmitting rotary motion connected with the means for generating rotary motion, and a rotatable cutting head connected with the means for generating rotary motion by the means for transmitting rotary motion, said cutting head including:

first and second housing members, each having a cylindrical side portion defining at least one orifice, a central cylindrical portion, a radially extending portion interconnecting the side portion to the central portion, and a radial abutment surface on the cylindrical side portion opposite from the radially extending portion, said first and second housing members being so positioned that their radial abutment surfaces are in confronting relation to define a chamber between the first and second housing members, first and second spools independently and rotatably mounted on said central cylindrical portions in said chamber, each spool being separate from the other, being of identical construction, and having wound thereon at least one flail for extension through one of said orifices, first means to selectively limit relative rotation between the first spool and the first housing member, and second means to selectively limit relative rotation between the second spool and the second housing member said first and second means allowing independent rotation between said spools whereby said at least one flail on each spool can be extended through an orifice independently of said at least one flail on the other spool.

18. The mower defined in claim 20 wherein:

said first spool has two flails wound therearound in the same direction and said second spool has two flails wound therearound in the said direction, and said first and second housing members are of identical construction and each define two orifices through which flail can be extended.

* * * * *